(No Model.) 2 Sheets—Sheet 1.

E. A. MARSH.
MICROMETER GAGE.

No. 329,181. Patented Oct. 27, 1885.

Witnesses.
H Brown
Thos. E. O'Connor

Inventor.
E. A. Marsh
by Knight Bros.
Attys

N. PETERS, Photo-Lithographer, Washington, D. C.

(No Model.) 2 Sheets—Sheet 2.
E. A. MARSH.
MICROMETER GAGE.
No. 329,181. Patented Oct. 27, 1885.
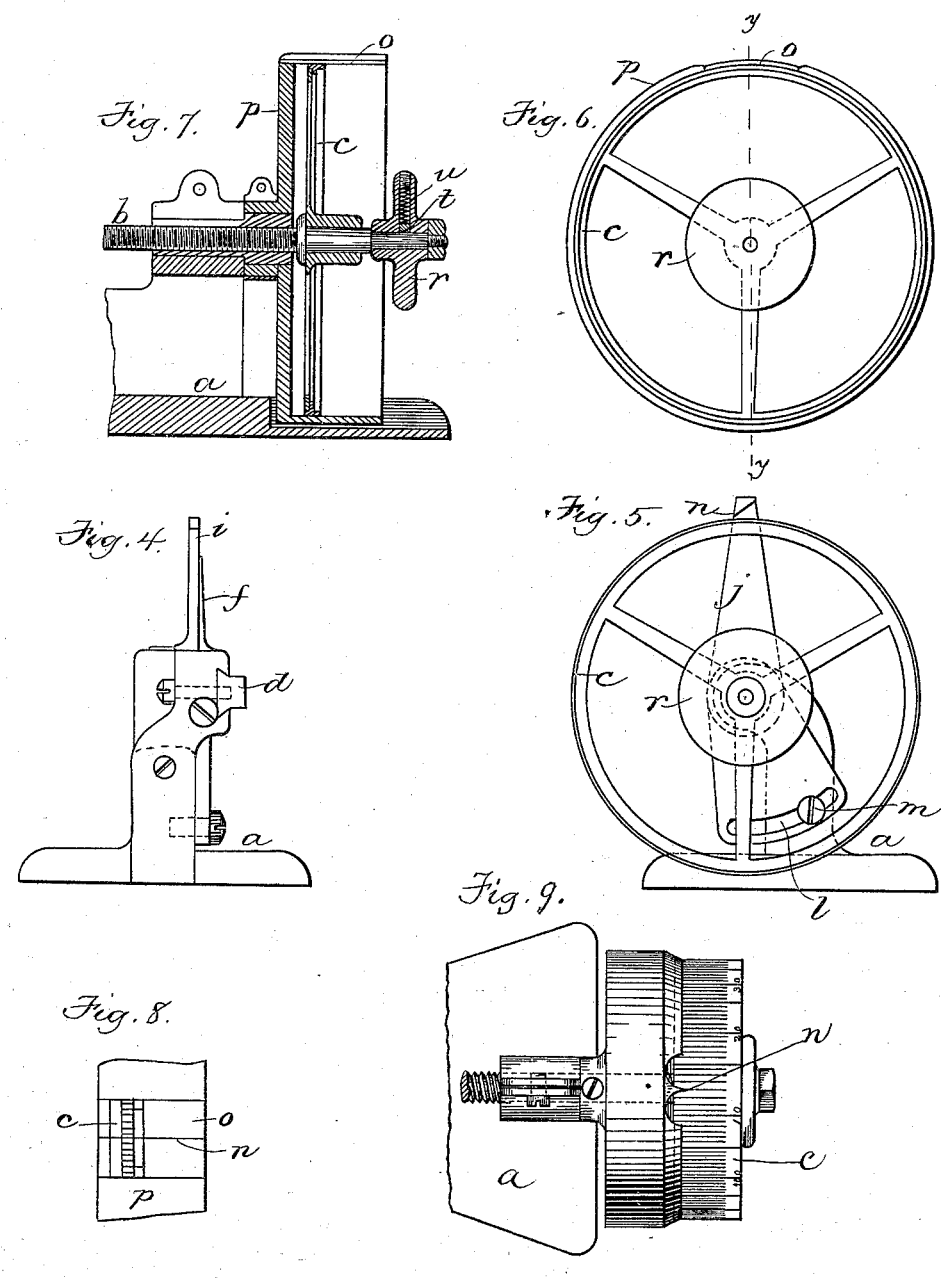

United States Patent Office.

EDWARD A. MARSH, OF NEWTON, MASSACHUSETTS.

MICROMETER-GAGE.

SPECIFICATION forming part of Letters Patent No. 329,181, dated October 27, 1885.

Application filed July 3, 1885. Serial No. 170,603. (No model.)

*To all whom it may concern:*

Be it known that I, EDWARD A. MARSH, of Newton, in the county of Middlesex and State of Massachusetts, have invented certain new and useful Improvements in Micrometer-Gages, of which the following is a specification.

In the manufacture of watches, and in various other mechanical operations of like nature, it is necessary that there should be provided means for convenient and accurate measurements. Various devices have been designed to meet this want; but nearly all are very limited in their scope, and also unreliable in action, and lacking in accuracy and uniformity in different portions of their range. Some of them, moreover, by the nature of their construction and mode of use, are of necessity subject to such wear as renders them certain of constant deviation, and therefore unreliable for accuracy.

To overcome all the above-mentioned serious difficulties, and to provide an instrument or gage simple and cheap in construction, durable in its nature, comprehensive in its scope, and accurate in performance, as well as convenient in use, is the object of my invention, which consists in the several improvements hereinafter described and claimed. As a means for the accomplishment of this object, I employ an accurately-cut screw, which is accepted as being the most reliable means known for obtaining accurate graduations. The manner of its use and the construction of the instrument will be made plain by the following description, together with the accompanying drawings, in which—

Figure 1:
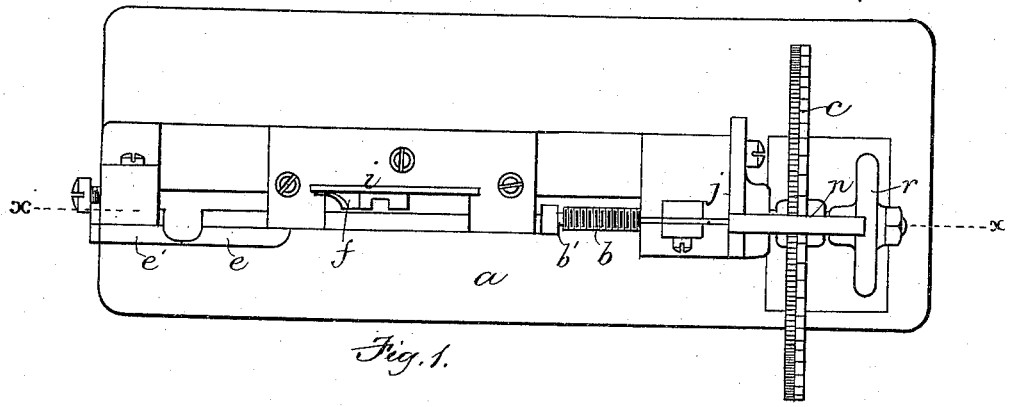
Figure 2:
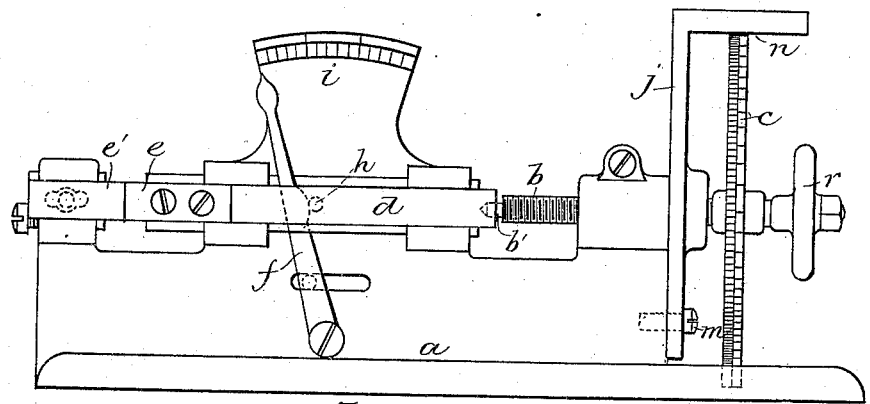
Figure 3:
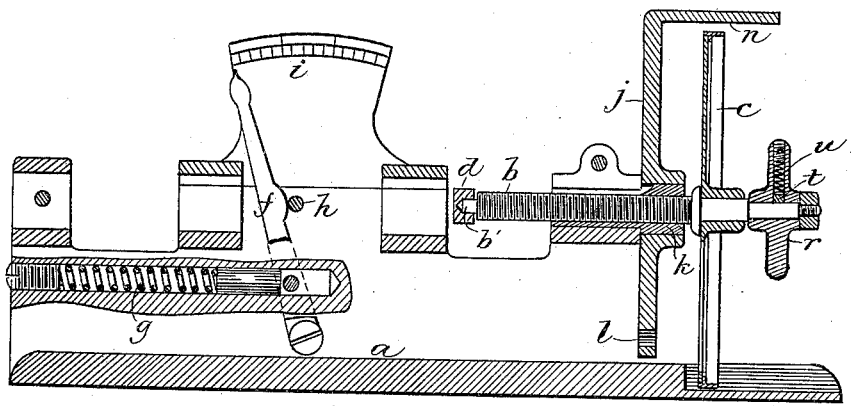

Figure 1 represents a top plan view of a gage embodying my invention. Fig. 2 represents a side elevation of the same. Fig. 3 represents a longitudinal section on line $x\,x$, Fig. 1. Figs. 4 and 5 represent end elevations. Fig. 6 represents an end elevation of a modification. Fig. 7 represents a section on line $y\,y$, Fig. 6. Fig. 8 represents a top view of a part of the modification shown in Figs. 6 and 7. Fig. 9 is a top view of modification of means for indicating fractional portions of a revolution.

The same letters of reference indicate the same parts in all the figures.

In the drawings, $a$ represents a supporting-frame or bed-piece, in one end of which is a threaded socket fitting an accurately-cut screw, $b$, which carries near its outer end a disk or index, $c$, having a graduated periphery. The inner end of this screw is preferably formed as a step, $b'$, (either male or female,) to bear against and give motion to a suitable slide, $d$, which is fitted to slide freely in ways or grooves in the frame $a$ in line with the screw.

The opposite end of slide $d$ is provided with a suitable jaw, $e$. A corresponding jaw, $e'$, is fixed to frame $a$, but provided with convenient means for adjustment, here shown as a slot in the jaw and a set-screw entering the frame through said slot. Between these two jaws is inserted the article to be measured.

Hinged or pivoted at a suitable point below the slide $d$ is an arm, $f$, which extends upward past the slide, its upper end being made in the form of a pointer. At a suitable point this arm receives pressure from a spring, $g$, causing it to bear against a stud or roll, $h$, fixed to slide $d$, thereby holding the slide in contact with the step or end of the screw $b$.

$i$ represents a fixed graduated surface over which the arm $f$ is moved. The turning in of the graduated screw $b$ carries with it the slide $d$, which, by means of stud $h$, moves the rocking arm or pointer $f$, which indicates on index $i$ the number of turns of screw $b$, which, read with the fractional parts of a turn, as shown on the graduated index or dial $c$, will indicate the exact size of the article being measured.

The dial or index $c$ is in the form of a disk or cylinder of a length corresponding to the range or compass of the gage, with lines of graduation running parallel to its axis. It is necessary to provide a suitable indicator designating the point from which to read. This indicator is preferably made in the form of an arm, $j$, mounted to turn on a boss, $k$, surrounding the screw $b$, and provided with a segment-slot, $l$, in its lower end, through which passes a set-screw, $m$, which secures the arm firmly to the frame $a$. The upper end of the arm is bent over the periphery of the disk $c$, and constitutes a straight-edge, $n$, or initial point from which to read the graduations of the disk $c$, said initial point being capable of adjustment by means of the slot $l$ and set-screw $m$, the latter securing the arm in a position to which it may be adjusted; or the initial point may be in the form of a line ruled upon a piece of glass, $o$, or other transparent substance, set in a casing, $p$, surrounding the disk

*c*, said casing being capable of being rotated to adjust the initial point as may be desired.

To guard against any straining of the gage by unduly forcing the screw *b*, and to insure at all times a uniform pressure against the work to be measured, means are provided for turning the screw by frictional contact, and that this contact may be as delicate and sensitive as possible I apply this friction near the center of the axis of the screw *b* by means of a spring in connection with any convenient form of crank or disk. In this instance I have shown a thumb-knob, *r*, adapted to rotate independently between two shoulders on the outer end of the screw *b*, and provided with a radial cavity containing a piston or pressure pad or block, *t*, of suitable material, and a spring, *u*, which presses said block against the surface of the screw. The friction of the pad *t* on the screw is sufficient to cause the screw to rotate with the thumb-knob when there is no resistance to the movement of the screw; but when the movable jaw touches the surface of the article to be measured the resistance causes the instant stoppage of the screw, so that if the movement of the thumb-knob be continued it will impart no further pressure to the movable jaw.

I do not limit myself to the particular form of gage shown in the accompanying drawings. The form of the frame may be modified to meet any desired use. It may also be vertical instead of horizontal, and the jaws may be of any desired form.

Having thus described my invention, what I desire to claim is—

1. The herein-described micrometer-gage, comprising a frame, an adjustable jaw adapted to be fixed in its adjusted position, a slide carrying a movable jaw, a screw working in a threaded socket in the frame and engaging the slide, a pointer pivoted in the frame and held by a spring against the slide carrying the movable jaw, a fixed graduated surface which co-operates with said pointer to indicate the number of rotations of the screw, and a disk and pointer to indicate a fraction of a rotation of said screw, as set forth.

2. The combination, in a micrometer-gage, substantially as described, of a supporting-frame, a movable jaw secured to a slide which is fitted to move in a guide in said frame, a screw working in a threaded socket in the frame and engaged with the slide of the movable jaw, a pivoted pointer which is moved by the movable jaw or its slide, and a graduated surface over which the pointer moves to indicate rotations, as and for the purpose set forth.

3. The combination of a supporting-frame, a jaw affixed thereto, a movable jaw secured to a slide which is fitted to move in a guide in said frame, a screw working in a threaded socket in the frame and engaged with the slide of the movable jaw, a pointer which is moved by the movable jaw or its slide, and a fixed graduated surface which co-operates with said pointer to indicate the number of rotations of the screw, as set forth.

4. The combination of a supporting-frame, a jaw affixed thereto, a movable jaw secured to a slide which is fitted to move in a guide in said frame, a screw working in a threaded socket in the frame and engaged with the slide of the movable jaw, a graduated disk on said screw co-operating with a fixed pointer to indicate parts of a rotation of the screw, a pointer which is moved by the movable jaw or its slide, and a fixed graduated surface which co-operates with said pointer to indicate the number of rotations of the screw, as set forth.

5. The combination, in a micrometer-gage, substantially as described, of a supporting-frame, a jaw affixed thereto, a movable jaw secured to a slide which is fitted to move in a guide in said frame, a screw working in a threaded socket in said frame and engaged with the said slide, with the improved operating crank or handle, made with a radial socket or cavity containing a spring, *u*, and a block or pad, *t*, against which the spring presses to hold the same against the surface of the screw to movably hold the handle or crank to the screw, whereby when the movable jaw meets an obstruction the movement of the screw is stopped, while the handle or crank is permitted to turn, as set forth.

6. The combination of a supporting-frame, a jaw affixed thereto, a slide movable in a guide in said frame and supporting a jaw co-operating with the fixed jaw, a screw working in a threaded socket in said frame and bearing at one end against said slide, and a spring which holds the slide in contact with the end of the screw, as set forth.

7. The combination of a supporting-frame, a jaw affixed thereto, a slide movable in a guide in said frame, a jaw affixed to said slide, a screw bearing at one end against said slide, an arm or pointer pivoted to the frame, a spring which presses said arm against a projection on the slide, and thereby presses the slide against the end of the screw, and a fixed graduated surface co-operating with the pointer, as set forth.

8. The combination of the supporting-frame, the fixed jaw, the movable jaw and its operating devices, including the screw *b*, the graduated disk on said screw, the arm *j*, co-operating with said disk, to indicate the fractional parts of a complete rotation of the disk, and means, substantially as described, for adjusting said arm and holding it in any position to which it may be adjusted, as set forth.

In testimony whereof I have signed my name to this specification, in the presence of two subscribing witnesses, this 24th day of June, 1885.

EDWARD A. MARSH.

Witnesses:
 WM. H. WRENN,
 D. H. CHURCH.